US012737717B2

(12) United States Patent
Xiao et al.

(10) Patent No.: US 12,737,717 B2
(45) Date of Patent: Sep. 15, 2026

(54) NETWORK INVENTORY MANAGEMENT AND ANOMALY DETECTION SYSTEM

(71) Applicant: HSBC Group Management Services Limited, London (GB)

(72) Inventors: Huang Xiao, London (GB); George Webster, Sevenoaks (GB); Bojan Kolosnjaji, London (GB); Andrew Carney, Arlington, VA (US)

(73) Assignee: HSBC Group Management Services Limited, London (GB)

( * ) Notice: Subject to any disclaimer, the term of this patent is extended or adjusted under 35 U.S.C. 154(b) by 705 days.

(21) Appl. No.: 17/945,711

(22) Filed: Sep. 15, 2022

(65) Prior Publication Data

US 2024/0095662 A1 Mar. 21, 2024

(51) Int. Cl.
*H04L 67/56* (2022.01)
*G06F 16/18* (2019.01)
(Continued)

(52) U.S. Cl.
CPC .......... *G06Q 10/087* (2013.01); *G06F 16/18* (2019.01)

(58) Field of Classification Search
CPC .............................. G06Q 10/087; G06F 16/18
See application file for complete search history.

(56) References Cited

U.S. PATENT DOCUMENTS 10,062,052 B2 * 8/2018 Saylor .................. G06Q 10/087
10,237,294 B1 3/2019 Zadeh et al.
(Continued)

FOREIGN PATENT DOCUMENTS

EP 1321872 A1 6/2003
JP 2007004269 A 1/2007
WO 2022/170132 A1 8/2022

OTHER PUBLICATIONS

Ribeiro, Leonardo F. R. et al., "struc2vec: Learning Node Representations from Structural Identity," 23rd ACM SIGKDD International Conference on Knowledge Discovery and Data Mining (2017), Jul. 3, 2017, 10 pages, <URL: https://arxiv.org/pdf/1704.03165.pdf>.

*Primary Examiner* — Talia F Crawley
(74) *Attorney, Agent, or Firm* — Dentons Durham Jones Pinegar

(57) ABSTRACT

A method of generating a consolidated asset inventory database. The method creates a consolidated asset inventory based on asset information obtained from various sources, in which asset objects are associated with various asset attributes. The consolidation includes, for a given network infrastructure asset, identifying asset data from multiple sources relating to the same asset based on common identifier values and combining the identified asset data into a consolidated data representation of the asset associated with the common identifier value(s) and including attributes from the multiple sources. After identifying an asset attribute for which a value in the consolidated asset data representation is missing or invalid, a trained prediction model is applied to other attributes of the asset to generate a predicted value for the identified attribute which is stored in the consolidated asset data representation in the database. Methods for identifying network connectivity and detecting network anomalies are also disclosed.

6 Claims, 12 Drawing Sheets

(51) Int. Cl.

| | |
|---|---|
| ***G06Q 10/087*** | (2023.01) |
| ***H04L 41/14*** | (2022.01) |
| ***H04L 45/12*** | (2022.01) |

(56) References Cited

U.S. PATENT DOCUMENTS

| | | | | |
|---|---|---|---|---|
| 10,805,163 | B2 * | 10/2020 | Tandel | H04L 63/1408 |
| 11,178,007 | B1 * | 11/2021 | Belton, Jr. | H04L 41/142 |
| 11,790,049 | B1 * | 10/2023 | Dhir | G06V 10/40 382/155 |
| 11,909,597 | B1 * | 2/2024 | Brown | H04L 45/123 |
| 2013/0322298 | A1 * | 12/2013 | Alexander, Jr. | H04L 41/12 370/255 |
| 2014/0131434 | A1 * | 5/2014 | Ozkan | G06Q 10/087 235/375 |
| 2015/0009013 | A1 * | 1/2015 | Cartwright | G06Q 10/087 340/10.1 |
| 2017/0193417 | A1 * | 7/2017 | Syed | G06Q 10/06315 |
| 2018/0165361 | A1 * | 6/2018 | Erickson | H04L 41/122 |
| 2021/0360021 | A1 * | 11/2021 | Pagano | G06N 3/02 |
| 2022/0414556 | A1 * | 12/2022 | Seabloom | G06Q 10/04 |
| 2025/0069145 | A1 * | 2/2025 | Pellerin | G06Q 10/1097 |

* cited by examiner

FIGURE 3

NETWORK INVENTORY MANAGEMENT AND ANOMALY DETECTION SYSTEM

BACKGROUND

The invention relates to management of network inventories. Embodiments relate to creation of consolidated inventories, connectivity analysis and use of network inventories in anomaly detection.

In recent years, asset management for IT (Information Technology) infrastructures has become increasingly complex due to issues such as cloud integration, BYOD (Bring Your Own Device), and proliferation of IoT (Internet of Things) devices. In typical modern network environments, IT assets change rapidly and dynamically over time. This is especially the case for virtual assets—for example, virtual machines might be spun up and down frequently, e.g. to deal with changes in load profiles.

While inventory management systems can be used to track IT assets, existing inventories for enterprises are often maintained and updated using inefficient and often manual processes by IT managers. Asset information can in some cases be pushed automatically and in other cases is recorded in the inventory manually. The quality of various inventories relies on either automation rules or designated business processes to ensure inventories are kept accurate and up-to-date.

Differences in procedures and ad hoc maintenance strategies can frequently result in a lack of transparency and inconsistency of data providence. The inventory quality often cannot be assured due to issues such as misconfiguration, off-policy maintenance, human mistakes, change of responsibility and so on. Moreover, there is no single source of truth, so that it is not possible to tell how accurate and reliable the inventories are. In some cases—especially for the vast infrastructures managed by large organisations—there may often be multiple sources of asset inventory information. Different inventories can be incomplete, out of date, and/or may contain conflicting information. Conflicts can exist both within a single inventory and across different inventory stores. Comparison of inventories often reveals inconsistencies in the data quality, and in the completeness of the data surrounding the inventories. These inventory deficiencies can lead to suboptimal business decisions, suboptimal operations, and security vulnerabilities.

SUMMARY

Embodiments of the invention aim to provide tools to address some of the drawbacks of known approaches in this area.

In accordance with a first aspect of the invention, there is provided a method of generating a consolidated asset inventory database, comprising:

- receiving asset information relating to assets of a computer network infrastructure from a plurality of network information sources;
- creating a consolidated asset inventory database based on the asset information, comprising a plurality of asset data objects representing assets, each data object associated with one or more (typically a plurality of) asset attributes;
- wherein the consolidating comprises, for a given network infrastructure asset:
- identifying asset data from two or more of the sources relating to the same given network infrastructure asset based on one or more common identifier values;
- combining the identified asset data from the sources into a consolidated data representation of the asset in the consolidated inventory database associated with the common identifier value(s) and including attributes from the multiple sources.

The method optionally further comprises identifying an asset attribute for which a value in the consolidated asset data representation is missing or invalid; applying a trained prediction model to one or more other attributes of the given asset to generate a predicted value for the identified attribute; and storing the predicted value for the attribute in the consolidated asset data representation for the given asset in the database.

Assets may include any entity used for the provision of IT functions and services, including physical entities (e.g. devices such as personal computing/communications devices, servers, data storage devices, routers, switches, ports, connections, peripheral devices e.g. printers etc.), virtual entities (e.g. virtual machines, containers, virtual switches etc.), other software entities (e.g. software/application installations, operating systems, hypervisors etc.), data entities (e.g. logical data volumes, file systems, files, databases etc), and other IT artefacts (e.g. user accounts or identities, addresses, domain names etc.)

The common identifier value may comprise one or more of: a network address, for example a MAC address and/or IP address; a hostname or other device identifier.

The method preferably comprises: identifying a plurality of attributes with missing or invalid values in the consolidated asset representations of one or more assets; for each identified attribute, selecting a respective trained prediction model for prediction of that attribute and applying the selected model to predict a value for the attribute; and storing the predicted values in the consolidated asset representations.

The method preferably comprises training one or more prediction models, based on asset information, each model trained to predict a respective target attribute for an asset based on one or more other asset attributes. The prediction model preferably comprises a neural network, the method preferably comprising converting non-numeric asset attribute values into a numerical representation for input to the neural network.

The method preferably comprises identifying one or more duplicate attributes in the asset data from the two or more sources, and excluding the duplicate attribute(s) from the consolidated asset representation. Attributes in the consolidated attribute representation may, for example be stored as key-value pairs. The term "data object" as used herein may encompass any data structure or data entity and is not limited to (but can include) objects in the narrower sense used in relation to object-oriented programming or object databases.

The plurality of network information sources may comprise one or more network inventory databases. Preferably, the plurality of network information sources comprises at least two network inventory databases having different data schemas for asset information, the data schemas optionally defining respective different (though possibly overlapping) sets of asset attributes for assets.

Alternatively or additionally, the plurality of network information sources may include a live network information source. The term "live network information" preferably encompasses any information received from a network or one of its devices or components during operation of the network/device/component, where such information may, for example, pertain to the network, device or component, its features or characteristics, or its operation.

The live network information source preferably includes a network monitoring and/or discovery system arranged to monitor activity in the network and/or interact with network entities to obtain information relating to network assets. The method preferably comprises obtaining from the live network information source one or more of: communication information relating to communication between assets, and device information, for example device properties obtained from network assets or associated management agents. Communication information may include one or more of: network traffic information, for example traffic volume or rate information; protocol message information (e.g. relating to protocol requests/responses for various network protocols such as DHCP or DNS), and connection information (e.g. relating to connections established between assets).

In a further aspect of the invention, which may be combined with the above aspect, there is provided a method of identifying network connectivity in a network infrastructure, comprising:

- accessing an inventory database of network infrastructure assets;
- accessing interaction data relating to interaction between assets, the interaction data providing information on interactions occurring between assets and associated with time information pertaining to times of the interactions;
- receiving a time parameter;
- creating a connection graph for a set of assets in the asset database, the connection graph having nodes representing assets and edges connecting nodes representing interactions between the assets, wherein the edges connecting nodes are determined based on interaction data relating to a given time period in dependence on the time parameter; and
- storing the connectivity graph in a graph database.

The method preferably comprises selecting the set of assets from the database based on the time parameter. The time parameter may, e.g., be (or specify) a time or time window. The interaction data preferably comprises communication data relating to communication between assets, the method comprising linking a given pair of nodes in the graph with a graph edge where the communication data indicates communication interaction between the assets represented by the given pair of nodes during a time period specified by the time parameter.

The communication data may comprise network traffic information relating to connections and/or data transmissions between assets. The communication data may comprise one or more of: data relating to connections established between assets; data relating to data or packet flows between assets; data relating to network protocol exchanges between assets, such as DNS or DHCP requests and/or responses.

Preferably, the method comprises generating a plurality of connectivity graphs corresponding to respective different time parameters and storing the plurality of connectivity graphs in the database. The method may comprise providing a user interface for receiving a time parameter (e.g. a time window), and displaying a connectivity graph for the network asset infrastructure based on the time parameter (e.g. indicating connectivity/interaction in the network during a time window indicated by the time parameter). The method may involve selecting a pre-generated stored connectivity graph corresponding to the time parameter from the graph database, or generating the connectivity graph on-demand from the asset inventory database. The method may further comprise enabling a user to inspect the connectivity graph using the user interface to view asset information associated with the nodes and/or connectivity information associated with the graph edges.

The method may comprise receiving network data including the interaction data from a network monitoring and/or discovery system (e.g. as used in the first aspect of the invention). Preferably, the method comprises: generating the inventory database of network infrastructure assets based on asset inventory data received from one or more network inventories; associating further asset data with assets in the inventory database based on the network data, preferably based on one or more common asset identifiers (e.g. as in the first aspect above) associated with the assets in the inventory database and with the network data.

In either of the above aspects, the method may comprise identifying, based on the (live) network data, an asset in the network infrastructure that is not represented in the inventory data received from the network inventories. The identified asset may then be added to the inventory database; and/or the identified asset may be highlighted as an unknown asset in the user interface.

Preferably, the method comprises identifying based on the network data an interaction between two assets for which no connectivity was previously identified in the consolidated inventory data and/or one or more previous connectivity graphs. In that case, the method may comprise one or more of: adding an edge to the connectivity graph corresponding to the interaction; and highlighting the interaction as an unknown interaction in the user interface.

The method in this aspect may include any of the steps or features of a method according to the first aspect set out above.

In a further aspect of the invention (which may be combined with any of the above aspects), the invention provides a method for detecting network anomalies, comprising:

- receiving asset data defining a plurality of network assets;
- creating a connectivity graph indicating connections between assets, the connectivity graph comprising nodes representative of assets and edges interconnecting nodes representative of connections between assets in the network;
- generating a node embedding for a given node of the graph, wherein the node embedding comprises a vector representation of the node encoding connectivity information relating to connectivity of the node within the graph; and
- comparing the node embedding to one or more further node embeddings to detect an anomaly.

The one or more further node embeddings preferably comprise node embeddings corresponding to the same node at one or more other times, preferably one or more earlier times. The method preferably comprises detecting an anomaly if the node embedding deviates from the one or more further node embeddings. The method may comprise identifying a deviation based on a distance or similarity measure indicating or distance or similarity between node embeddings, for example based on comparing a determined distance/similarity measure to a threshold.

Preferably, the method comprises, in response to detecting an anomaly, performing one or more of: transmitting a notification of the anomaly to a user device; and performing a control action in the network and/or at the asset associated with the node identified as anomalous.

The generating and comparing steps may be repeated for a plurality of nodes of the graph.

Preferably, creating a connectivity graph comprises creating a node for each of a plurality of assets and associating with each node an asset vector, comprising a set of attribute values associated with the asset. The method may comprise creating an adjacency matrix defining graph connectivity, the adjacency matrix defining edges between nodes corresponding to links between assets in the network, and associating with each edge one or more attributes specifying link attributes of the corresponding network link.

The method may comprise: collecting asset data relating to assets and asset connectivity for a training period; generating training samples based on the collected asset data, each training sample specifying a connectivity graph; for each training sample, generating node embeddings for nodes of the connectivity graph for the training sample; and wherein the comparing step compares the node embedding to one or more of the generated node embeddings. Each training sample preferably corresponds to assets and asset connectivity present in the network at a respective time or time window within the training period. Preferably, the method comprises generating a training sample for each of a sequence of time windows, and generating node embeddings based on each training sample.

The or each node embedding preferably comprises a vectorized representation of connectivity within the local neighbourhood of a node, preferably in the form of a vector encoding representative of the connectivity structure between the node and other nodes within the neighbourhood. The neighbourhood is optionally defined as encompassing one or more other nodes located up to a predetermined number of hops from the node. The node embedding is preferably based on the connection degree of each node in the neighbourhood.

Optionally, the or each node embedding may be generated using an embedding algorithm based on the struc2vec algorithm.

Node embeddings may encode one or more other features of a node (such as a device type), of a link and/or of connected node (e.g. within the neighborhood) as one or more additional dimensions of the node embeddings.

The invention also provides a system having means, optionally comprising one or more processing devices with associated memory for storing code and data, for performing any method as set out herein and one or more computer program(s), computer program product(s) or non-transitory computer readable media comprising software code adapted, when executed by a data processing system, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which:

FIG. 3 illustrates a set of asset data objects;

DETAILED DESCRIPTION

Embodiments provide an inventory management system that supports identifying computing assets that are active across a large, diverse computer network.

The system provides for real-time consolidation of inventory data from multiple inventory data sources. In addition to existing inventory sources (providing information on known assets), the system also gathers live network data from deployed network agents, discovery tools, network perimeter devices and the like. This allows identification of assets within a network infrastructure that are unknown to existing inventories. Additionally, the system can discover the behavioural context around assets, such as how assets are interacting with each other in the networking environment.

Combining data from these various sources allows the system to provide a more accurate view of the deployed assets in a managed IT infrastructure and improve the quality of the asset and inventory data. The resulting consolidated data provides a holistic view of assets within the infrastructure and their relationship within the networking environment.

Assets include (but are not limited to) hardware devices and software entities (e.g., physical devices and virtual systems), as well as meta information and other network artefacts (e.g. IP addresses, domain names, user identities).

The system enumerates and contextualizes the assets to identify the gaps in traditional inventory systems. The resulting consolidated asset inventory can be queried and analysed to gain a real-time view of the infrastructure. Information provided by this enhanced inventory can support the continuous improvement of the deployed infrastructure over time and enable data-driven inventory applications to increase operational efficiency and accountability, as well as providing information to support cybersecurity management tasks.

Figure 1:
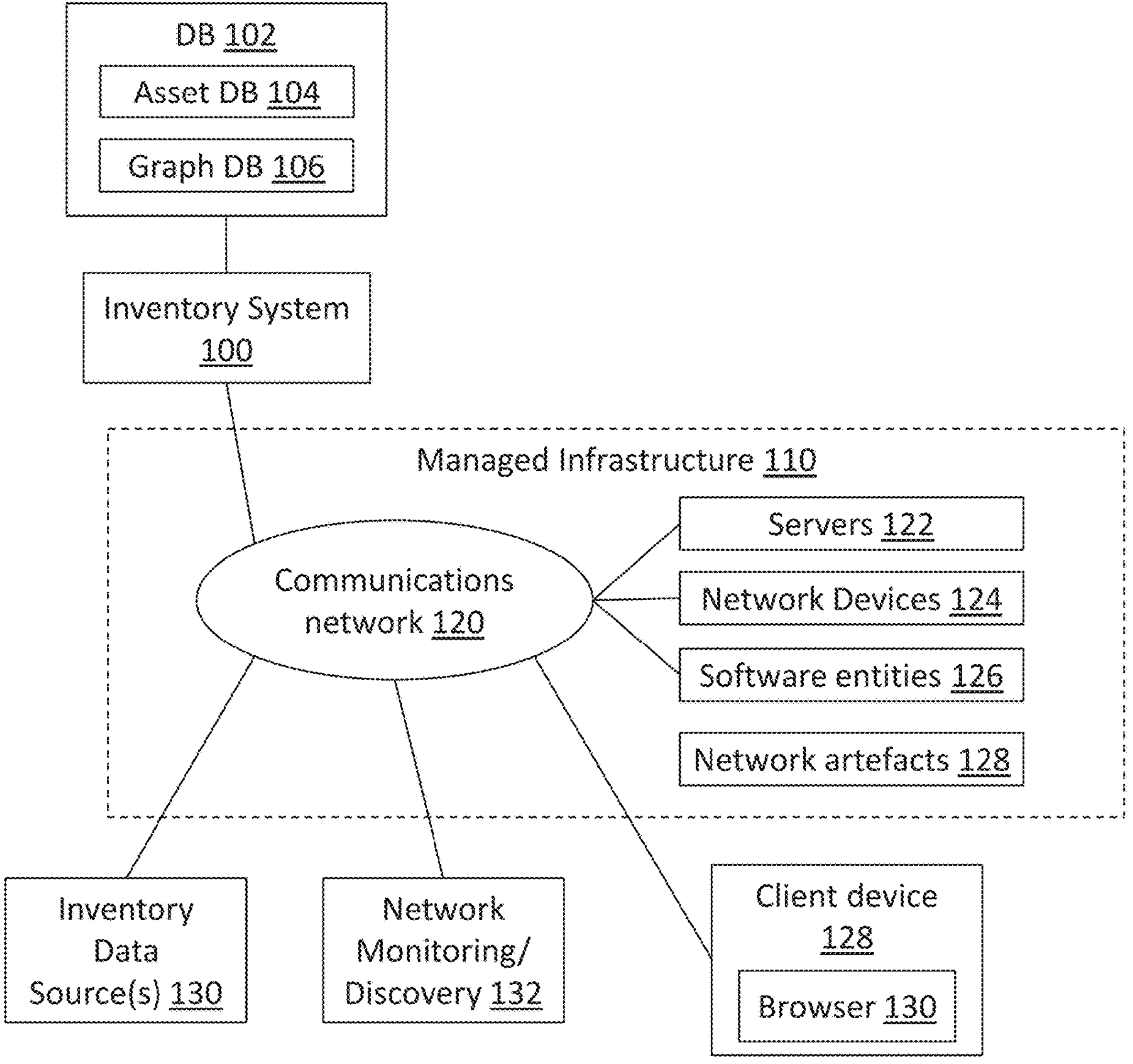
FIG. 1 illustrates an inventory management system in overview.

A consolidated inventory management system according to an embodiment is shown in FIG. 1. The system includes an inventory system 100 with associated inventory database 102. The inventory database 102 includes two distinct parts; an asset database 104 and a graph database 106 as will be described in more detail below.

The inventory system maintains an inventory for a managed infrastructure 110, including one or more communications network(s) 120 that incorporate various IT assets. IT assets may, for example include Servers 122 (e.g. physical server computers)

Network devices 124, such as routers, switches, firewalls, load balancers and the like Software entities 126, e.g. deployed operating systems, hypervisors, applications, application containers, virtual machines, web resources and the like Other network artefacts 128 utilised within the network, such as IP addresses, domain names, user identities etc.

Note that the above types of assets are given by way of example and the system can be extended to support any type of IT asset. Furthermore, particular assets may be associated with one or more different asset types. For example, a virtual machine may be considered both a (virtual) server and a software entity.

The communications network(s) 120 may include any suitable type(s) of computer networks, including wired and wireless local area networks, network fabrics (e.g. storage fabrics) and/or wide area networks such as the Internet. Typically, the managed infrastructure may consist of multiple networks or network segments, e.g. associated with different locations, data centres etc. used by a large organisation.

The inventory system 100 communicates via the communications network 120 with one or more inventory data source(s) 130. Each inventory data source contains inventory information for a set of assets in managed infrastructure 110. Typically, the inventory data sources are incomplete. For example, a particular source may include data for assets in a specific sub-network, location, business unit etc and/or for specific asset types. These may be legacy inventory sources (possibly maintained manually or using various different network management systems). Different sources may provide information for different (though possibly overlapping) groups of assets.

Furthermore, different sources may use different data schemas for representing asset information. The structure, content and format of inventory information may differ between sources, with sources including different (though possibly overlapping) sets of attributes for assets, capturing only certain asset types (e.g. only physical devices or physical software assets), or using inconsistent data formats for equivalent attributes etc.

The inventory system 100 receives asset information from the data sources and consolidates the information into a single consolidated inventory in its database 102.

The inventory system additionally receives live network information from network monitoring and discovery system 132. Network monitoring and discovery system 132 communicates with assets directly and/or with monitoring entities such as network management agents, probes, sensors etc. to obtain network and asset information. The inventory system combines this information with information from the inventory data sources to augment the inventory information in the consolidated inventory database 102.

A user communicates with the inventory system via a client device 128, for example to view, explore and analyse the inventory information in the consolidated inventory, via an inventory application. The application may e.g. be in the form of a web application running in a web browser 130 at the device. However, a bespoke native application could also be provided.

While inventory system 100, database 102, inventory data sources 130, network monitoring/discovery system 132 and client device 128 are shown for clarity as being located outside the managed infrastructure 110 any or all of these entities could themselves form part of the managed infrastructure and thus be recorded in the inventory maintained by the system.

Figure 2:
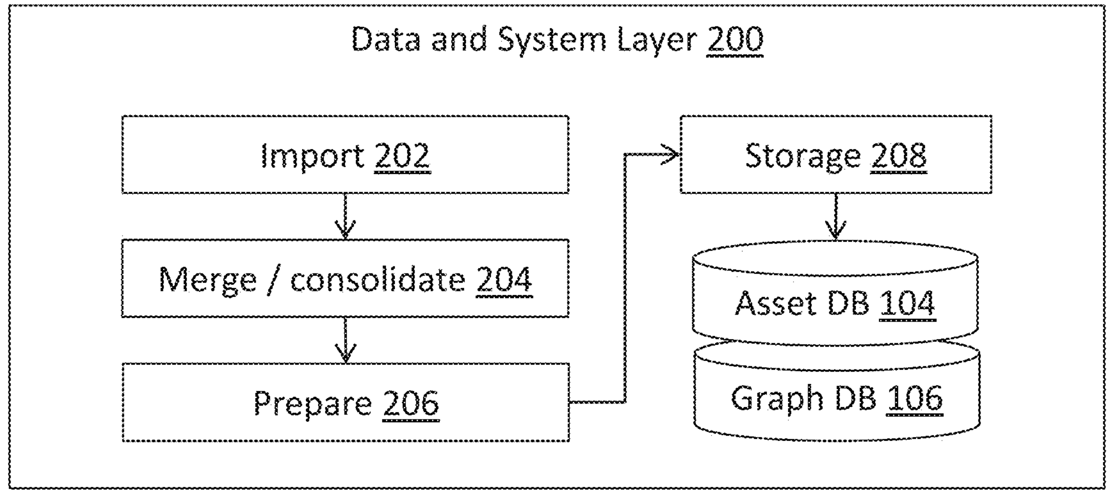
FIG. 2 illustrates functional components of the inventory management system.
Figure 2:
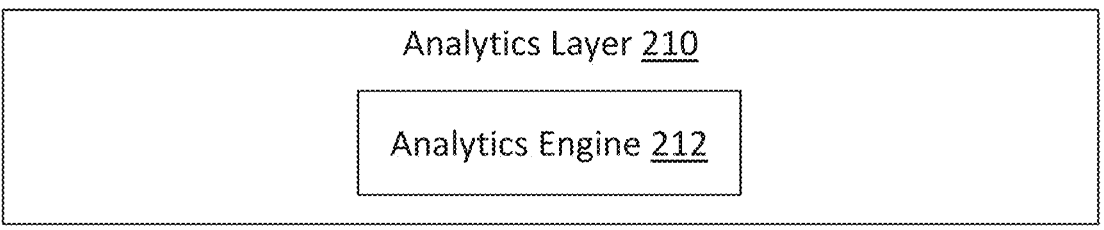
Figure 2:
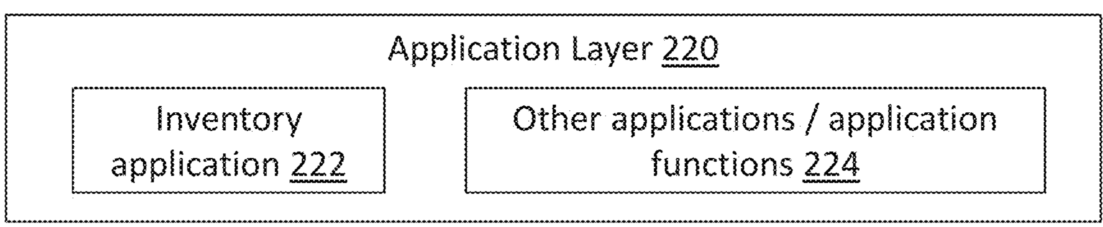

FIG. 2 illustrates the functional architecture of the consolidated inventory system 100 in an embodiment. The system comprises three functional layers: a data and system layer 200, an analytics layer 210 and an application layer 220.

The data and system layer 200 includes functions for ingesting, consolidating and processing inventory information from various sources, including existing inventory sources 130 and network monitoring/discovery system 132 to create a comprehensive inventory of all assets which provides a consistent view of the managed infrastructure.

Analytics layer 210 provides functionality in the form of analytics engine 212 for analysing the inventory data to provide insights about assets, detect previously unknown assets and interactions between assets and the like.

The application layer 220 provides various application functions 222, 224 built on top of the analytics and data layers that utilise the consolidated inventory. In particular, this includes an inventory application 222 allowing a user to visualise, query and inspect the information from the inventory database and/or information produced by the analytics engine.

The various layers are described in more detail in the following sections.

Data and System Layer

The data and system layer 200 implements a data import and consolidation pipeline including the following functions:

Import function 202 for importing data from the various data sources

Consolidation function 204 for merging and consolidating information from different sources Data preparation functions 206 for preparing and cleaning the data, for example by normalising and formatting the data and adding missing attribute values Storage function 208 for storage and retrieval of the inventory data in the inventory database.

The described functional division is by way of example. In practice these functions may be implemented as separate functional modules or may be integrated into fewer or even a single functional module. Furthermore, the indicated order of functional blocks may be varied as needed.

As discussed in relation to FIG. 1, the inventory database includes two representations of the asset information, represented by two distinct data structures, referred to as the time series asset database 104 and the graph database 106.

After processing by the import pipeline 202-208, the system stores all identified assets in the time-series data store 104, capturing assets from the various sources as discussed above. Each asset is represented as a multi-dimensional object including a key identifier, time information, one or more labels, and a set of key-value attributes. The object identifier may, for example be a UUID (Universally Unique Identifier). The time information provides information on when the asset was detected in the network, as discussed in more detail below, and thus provides a time dimension to the asset data.

Figure 3:
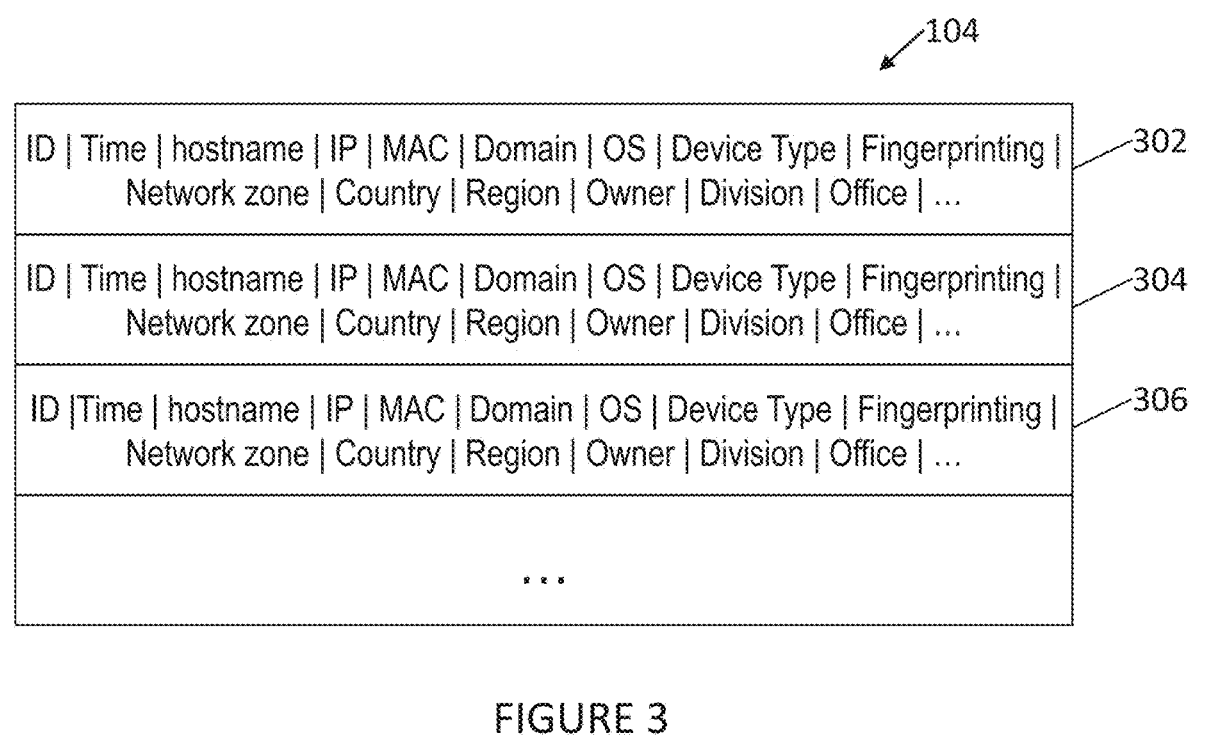

An example is illustrated in FIG. 3, showing the time-series asset database 104 as containing a set of asset objects 302, 304, 306 etc., each with various asset attributes such as ID, Time, Hostname, IP address, MAC address, Operating System etc. Note that while shown as including the same set of attributes, different assets and/or different types of assets may include different attribute sets. For example, a "server" asset may include different asset attributes than a "router" asset or a "software application" asset. Different asset attributes are supported by use of a key-value attribute structure, rather than a fixed record structure. Furthermore, particular assets may be missing certain attributes, for example when the source asset data was incomplete or where asset data originated from a source that did not include a particular attribute in its schema.

Figure 4:
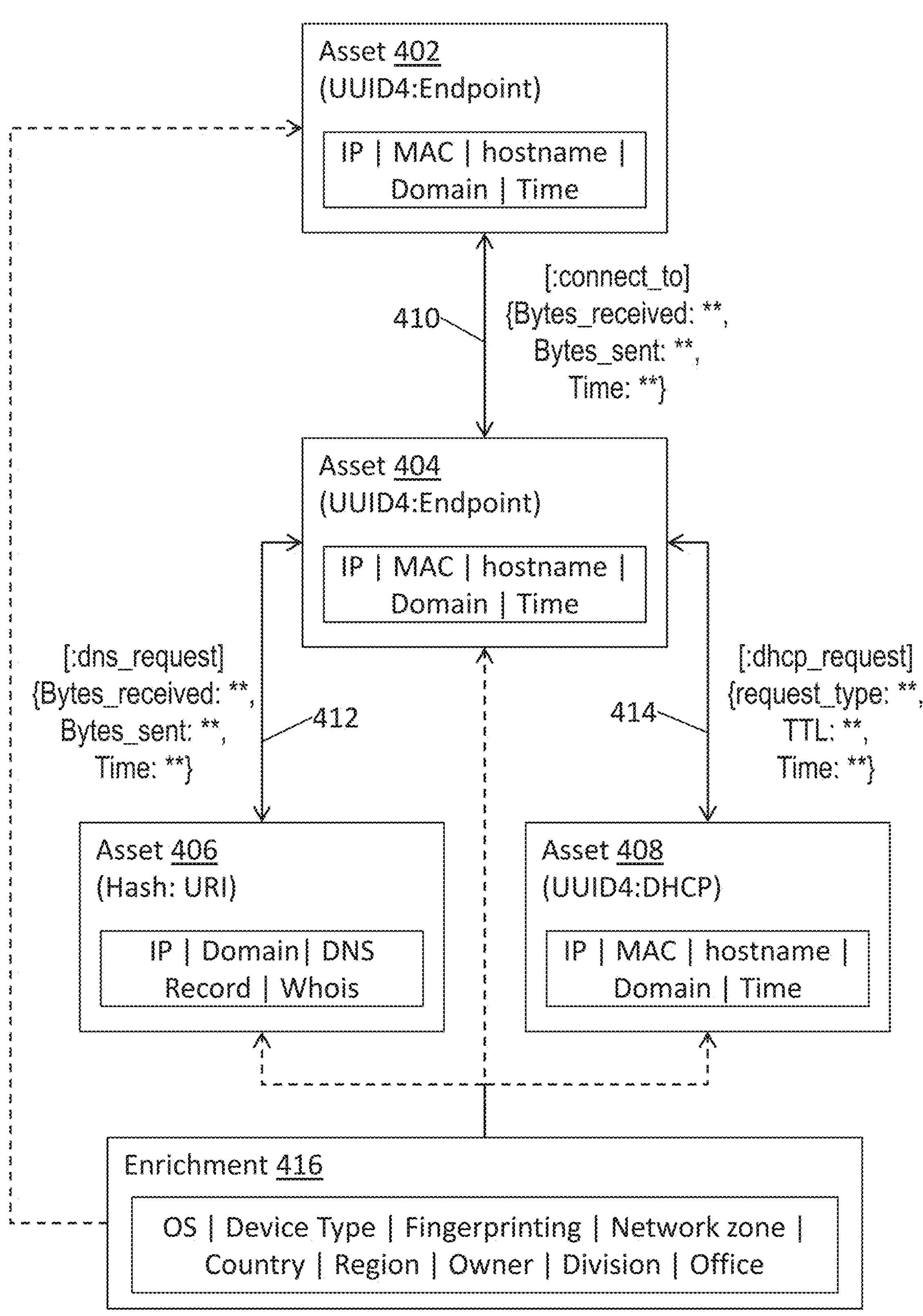
FIG. 4 illustrates an example of a graph representation of inventory data.

FIG. 4 illustrates the graph database 106. In the graph data structure, each asset is represented as a graph node (e.g. nodes 402-408) and relationships between assets are stored as graph edges (e.g. 410-414). Each asset node includes core asset information. Supplementary information may be stored in additional enrichment objects (e.g. 416) that are associated with the nodes. Asset nodes and enrichment objects may use the same key-value structure to store asset attributes.

Edges are directed and define interactions or other relationships between assets. These relationships can be derived from network traffic, event logs and so on. Each edge representing a relationship is associated in the graph database with relationship metadata, such as:

- The type of relationship, for example a connection (e.g. HTTP connection) between assets, a DNS request sent from an asset for a particular web resource, a DHCP request sent from an asset to a DHCP server and the like.
- Time information identifying a relevant time, for example time of a network interaction detected between assets
- Other data relating to the relationship, depending on relationship type (for example, bytes sent/received or packets sent/received for a connection relationship).

By way of example, FIG. 4 illustrates:

- a relationship 410 of type "connect_to" between two "endpoint" assets 402 and 404 (identified by UUIDs), e.g. identified in response to a connection established in the network between those assets;
- a relationship 412 of type "dns_request" between "endpoint" asset 404 and asset 406. Asset 406 may represent a web resource (identified by a hash of the resource's URI, Universal Resource Identifier), and the relationship 412 may have been identified from a DNS request sent in the network by asset 404 to resolve a domain name for the web resource;
- a relationship 414 of type "dhcp_request" between asset 404 and 408, where asset 408 may correspond to a DHCP server, the relationship identified from a DHCP request sent by the endpoint asset 404 to the DHCP server.

FIG. 4 shows exemplary metadata associated with each relationship. The specific metadata may vary based on relationship type.

Many other types of relationships are possible and can be represented in the graph database. Furthermore, two asset objects may be connected by multiple different relationship types.

The graph data structure in the graph database is derived from the time-series asset database, as described in more detail below.

Data Import and Consolidation Pipeline

As discussed above, the data import and consolidation pipeline consolidates data from various sources, such as:

- Existing inventories
- Data received from network discovery tools
- Data such as logs from network perimeter devices, such as DHCP, DNS, Netflow, Proxy, and Firewall devices
- Traffic data from network devices and/or endpoints, such as link data flow rates, NETSTAT data and the like (e.g. retrieved from a device/endpoint agent)
- Enrichment data; enrichment data is additional data about network assets obtained from sources other than the network itself. This, for example can come from the organisation operating the infrastructure (e.g. from a separate database) or public sources. As an example of a public source, WHOIS information can be retrieved from a public WHOIS server to enrich domain information.

In preferred embodiments, received Netflow data (or equivalent monitoring data) defines characteristics of connections and interactions, for example including one or more of:

- the source and destination of the network connection at a point of time,
- the volume of data sent (e.g. in bytes),
- the duration of the connection, and/or
- other information related to the connection.

Netflow records and other live network data, logs etc, received from the network monitoring/discovery system are stored in the database 102, e.g. as part of the time-series database 104, linked to the relevant assets as described below.

Figure 5:
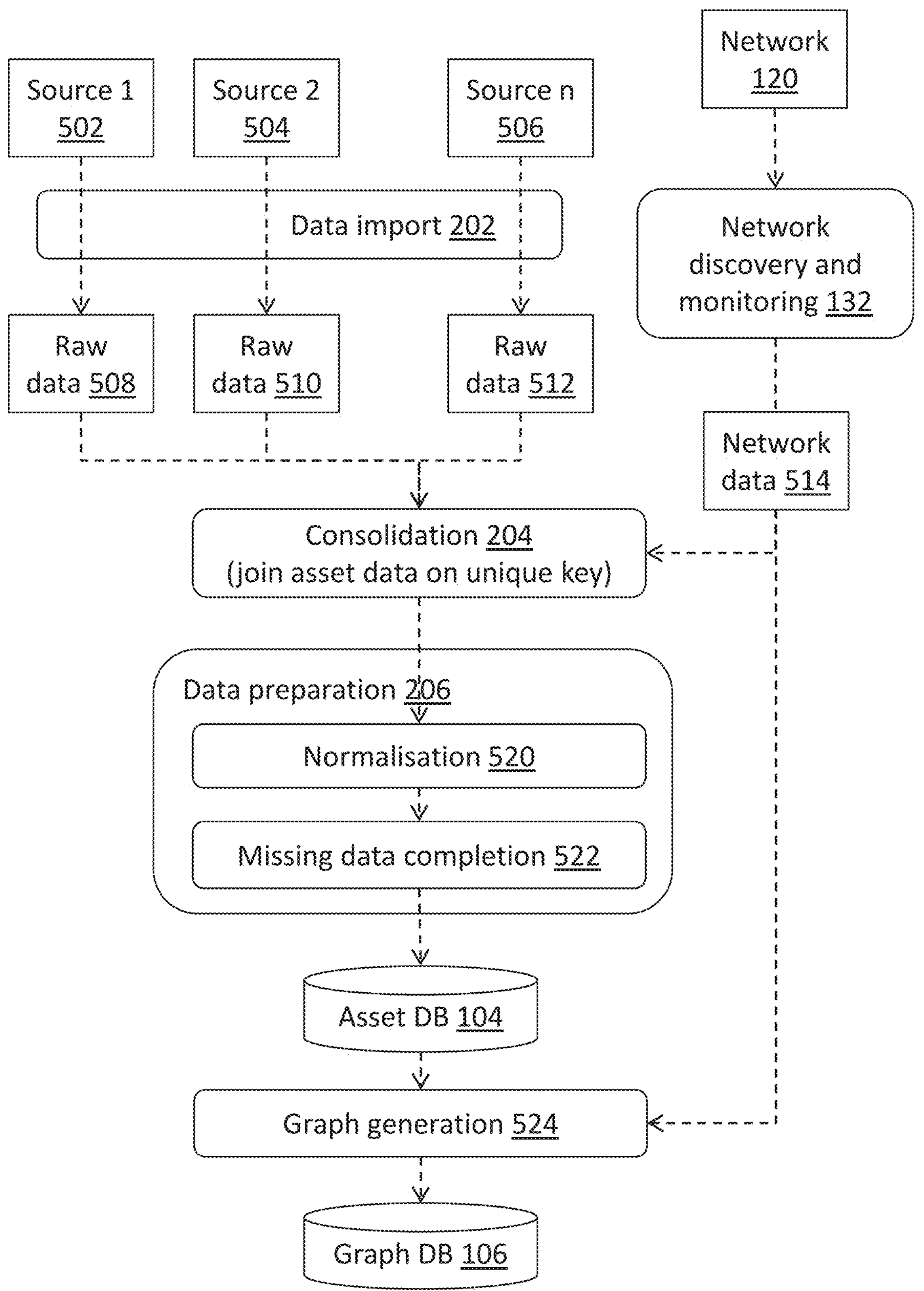
FIG. 5 illustrates a data ingestion and processing pipeline.

The import/consolidation pipeline is illustrated in FIG. 5.

For each data source, the import process 202 runs an extract, transform and load (ETL) pipeline to import the data from its various inventory sources 502-506 and apply any necessary pre-processing to clean the data. Any source data features not needed can be excluded from the imported data at this stage.

The import process 202 imports data from each inventory source into a staging area, resulting in raw data 508-512.

Consolidation process 204 then merges the data from the distinct sources by unique asset identifier, for example hostname, IP address and/or MAC address. In one implementation, a combination of hostname and MAC address is used where available. If a MAC address is not available, then the hostname on its own is used. However, other types or combinations of unique identifiers could be used. As a result of the consolidation, asset information from different inventories for an asset with the same unique identifier(s) is grouped into a single asset object. Asset attributes from different sources are added to the consolidated object as separate key-value attributes.

Live network data 514 relating to network assets is also received from the network monitoring and discovery subsystem 132 and is consolidated with the other asset data using the same unique identifier(s). Thus, where network data relating to a known asset (found from one of the inventory sources 502-506) is received, this is added to or linked to the same inventory object for that asset based on the matching unique identifier(s), as described above. Where network data relates to an unknown asset (having a unique identifier not matching any existing asset), a new asset object is created in the consolidated inventory to store the information obtained from the network.

For example, the network discovery/monitoring tool 132 may detect a device on the network and retrieve information such as MAC address, IP address, installed operating system (OS) by interrogating the device or an associated network management agent (e.g. using a network management interface) and then add this information to an existing asset object or create a new asset object.

Every asset is tagged with a timestamp when it is first identified in the network (based on live network data 514), or when it is subsequently updated based on new information received from the network. Updates can occur on a scheduled basis at various frequencies e.g. daily, hourly or even every minute, on-demand, or reactively, in response to receipt of live network information. The timestamps can allow the system to determine when an asset in the asset database was last "seen" in the network.

The result of the consolidation process 204 is a single combined view of assets retaining the relevant asset information as a set of attributes for each asset.

The data preparation stage 206 may include any required data cleaning operations. In particular, normalisation 520 may involve converting value data from different sources into consistent data formats, removing duplicate attributes and the like. Thus, where different sources provide the same attribute(s) for an asset, a single attribute is retained in the consolidated object. Where attribute values from different sources are inconsistent, values from a particular source may be used in preference to other sources or some other conflict resolution approach may be used. Matching attributes from different sources may be detected based on matching attribute names or based on a predefined mapping that identifies corresponding attributes in different sources.

Missing data completion 522 identifies specific assets having missing values for certain expected attributes and attempts to complete the missing data by deriving imputed data values for those attributes, as described in more detail later.

The consolidated asset objects are stored in the time-series asset database 104.

The resulting consolidated asset data is then further processed in graph generation process 524 to generate graph views of the asset inventory. In an embodiment, the system automatically constructs a time series of graph views of the asset data at defined time intervals. Each graph corresponds to data from a particular time window and represents a time capsule of the infrastructure inventory corresponding to that time window. For example, each time capsule may correspond to a time window of 24 hours, containing graph objects and relationships between those objects for that time window.

The asset data for each time capsule is used to create a graph by defining relationships between assets, for example Netflow connectivity, using network data 514. These relationships are represented as edges in the graph database, where assets along with their attributes are represented as nodes.

The time window for a graph is defined in relation to asset activity identified from live network data 514 (e.g. Netflow records), e.g. the times when assets are touching the network or interacting with other assets. The time window is used to aggregate these activities. The activities involve key relationships defined for certain use cases, preferably including the most typical relationships such as connectivity, DNS requests, and DHCP requests.

The aggregation involves determining various characteristics of asset activity and interactions during the time window, such as:

- how many connections are seen between two particular nodes during the time window;
- data volumes flowing between two nodes during the time window;
- number of DNS and/or DHCP requests from one asset to another during the time window.

The more granular the time window, the more accurately the system will be able to model the assets' behaviour.

As a concrete example of building the graph using Netflow data, the process could involve the system analysing the Netflow data for given a time window of 1 hour to determine various measures relating to interactions between two nodes, Node A and Node B:

- The system counts how many times Node A connects to Node B as seen from the Netflow data, identifying 25 connections.
- The system further aggregates the total bytes sent as 1024 bytes with a total duration of 15 seconds.
- The system then builds an edge E=(Node_A, Node_B, Bytes=1024, Duration=15 sec).

Note that the edge can be unidirectional or bidirectional by swapping Node_A and Node_B. The process iterates over all nodes and saves the identified relationships in the graph database.

Edges may be used to represent a variety of types of interactions between assets, such as:

- Data flows (e.g. packet flows)
- Successful or attempted connection establishment between assets
- Login attempts (whether successful or not), e.g. by a user to a server
- Specific network protocol exchanges, such as DHCP/DNS requests/responses These are identified from the network data 514. Network data is associated with time information, e.g. times of packet flows, protocol messages etc. As indicated above, each connectivity graph generated from the underlying asset inventory is associated with a specific time window. When generating a particular connectivity graph, only network data relating to asset interactions occurring during that time window is used to define connections between nodes in the graph. As a result, the node connections represent connectivity observed during the particular time window. For example, a connectivity graph may specify a connection between two assets that communicated during the time window, whereas another connectivity graph generated for a different time window during which no such communication occurred will not include a connection between those assets.

The time window may be explicitly specified (e.g. with start/end times), or may be specified by some other time parameter (e.g. a start time, with a default duration e.g. 1 hour being used to determine the end time).

An example connection graph is discussed in more detail in relation to FIG. 8 below.

The graph thus provides an enumeration of the assets in the network and their connections, interactions and other relationships at a particular time which can then be viewed and analysed.

Furthermore, the graph database can include separate connection graphs corresponding to the state of the infrastructure at different times/time windows. These different graphs can be generated automatically, for example at defined intervals. Alternatively (or additionally), graphs could also be generated on demand, e.g. by specifying the time window for which a graph is to be generated (e.g. by a user using the inventory application).

Missing Data Completion

Asset data obtained from the various sources may sometimes be incomplete. As a result, after import and consolidation, a particular asset object may have one or more missing attribute values. Preferred embodiments provide a data completion process 522 for generating imputed values for such attributes.

Missing attribute completion is typically applied to attributes that are expected to be present for all assets, for example attributes that are considered critical for security reasons, e.g., device type or OS information. These critical attributes are predicted or estimated if they cannot be resolved from anywhere else (e.g. from another inventory source).

In preferred embodiments, the data completion process includes a classification algorithm to predict a value of a target attribute given partial features about the asset.

For example, in order to identify the location of an asset which does not include a value for a location attribute, a combination of DHCP request server location, hostname pattern, IP location, locations of connected services and the like can be used to build a feature matrix and apply a previously trained machine learning prediction/classification model to predict its real location. As another example, the target attribute to be predicted may be a device type of an asset, such as "laptop", "server", "IP camera" etc.

The following discussion assumes that the predicted or target attribute is a categorical attribute (e.g. an attribute having one of a set of distinct category labels). However, the process can be extended to other types of attributes (e.g. numerical).

Figure 6:
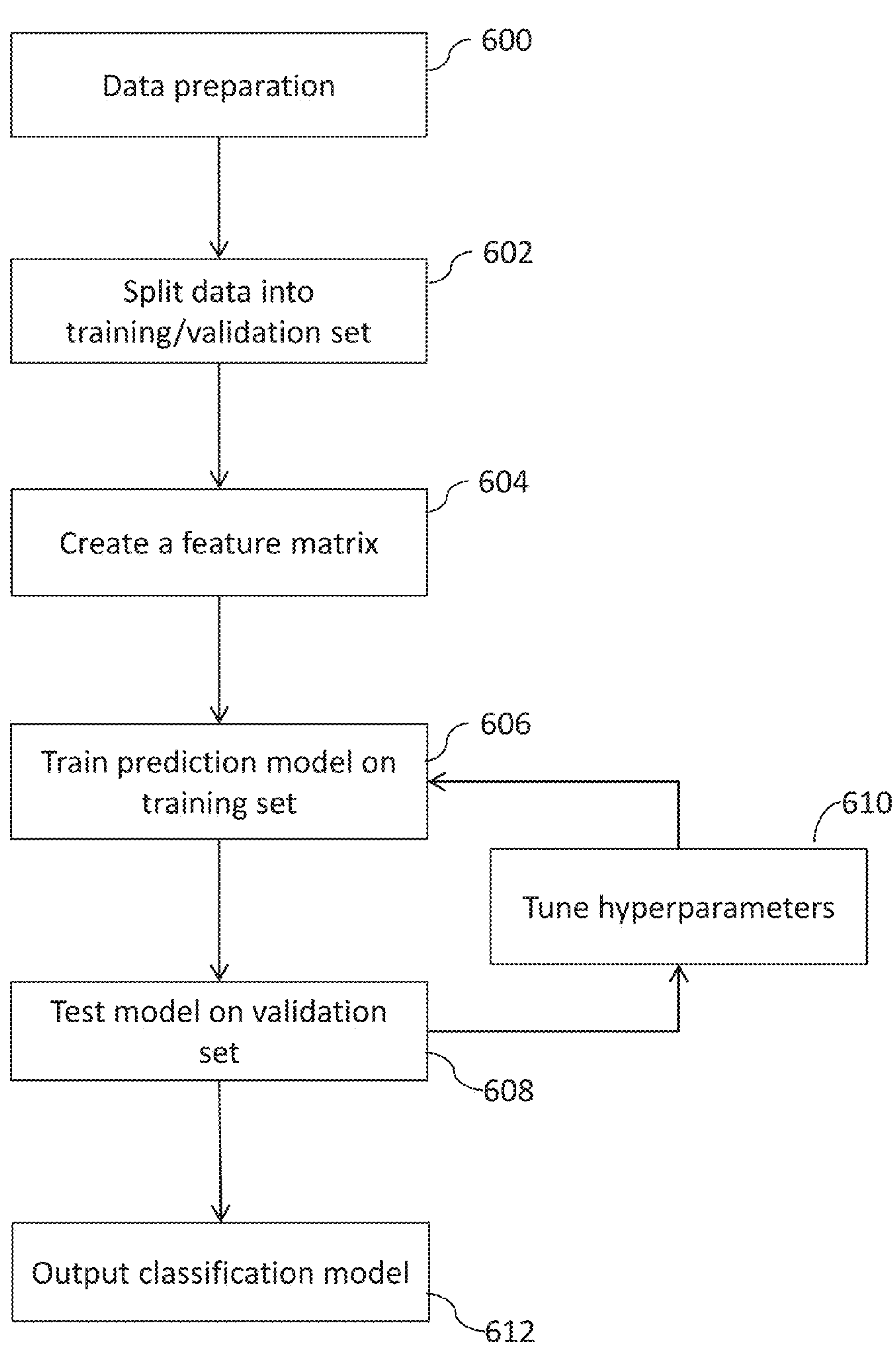
FIG. 6 illustrates a process for training a prediction model for predicting an asset attribute value.

A process for training the classification model for a given target attribute is shown in FIG. 6.

In step 600 any necessary data preparation/formatting is performed on the asset data in the time series database to create a dataset in a form suitable for the chosen machine learning model. In the present example, a neural network model is used, and the data preparation step thus converts relevant asset properties into numerical values. This step may process a subset of the assets (e.g. specific asset types) and/or a subset of the attribute data for assets depending on the requirements for the model and the attributes considered useful for prediction.

For example, some attributes, such as hostnames, IP addresses, operating system (OS), and MAC (media access control) addresses, may be particularly useful for predicting certain target attributes. These string values are therefore converted to numerical values.

Categorical attributes are preferably encoded using one-hot encoding. Attributes such as IP addresses are converted to decimal format. For arbitrary strings, such as hostname, 1-grams are used to count the frequency of characters in a fixed vocabulary. Below are some examples of feature conversion:

IP address: 128.10.65.1→4 16777216*128+65536*10+50*65+56*1

Hostname "abcdey123"→1111100 . . . 100111000000 (set binary according to position in vocabulary abcdefg . . . xyz0123456789)

The prediction targets are the attributes that the classification model should predict. The encoding of the target attribute will again depend on the type of the attribute. For instance, to predict device type, device types can be encoded as target label indices using a string indexer, which essentially just converts categories into numeric indices.

In step 602, the time series database is partitioned into a training set and a validation set. The training set includes a set of training samples, each corresponding to an asset with the set of input attribute values and target attribute value for the asset. The validation set includes a separate corresponding set of validation samples. The selection of the included attributes (prediction features) of the training/validation sets may depend on the target attribute to be predicted.

In step 604, a feature matrix is constructed from the training samples comprising the input attributes values and target attribute values for the training samples.

In step 606, a prediction model is trained on the features in the feature matrix to predict the target attribute. Preferred embodiments use a standard multi-layer perceptron (deep neural network) to train the model, where the output is a multi-class classifier, that can be used to predict a value of the target attribute based on the input attributes.

A neural network architecture may be designed manually for an attribute to be predicted, depending on the complexity of the predictive task. As a concrete example, for predicting location, a network with the following properties was used:

Input Size: 43 nodes, to represent the input features (e.g. as in the above example)

Output Size: 65 nodes, to represent the desired output location data

Hidden Layers: 8

Hidden Layer Size: 64

Bias nodes are additionally included in the various layers as known to those skilled in the art. Note in alternative embodiments, the neural network architecture may be automatically selected based on the input and output features of the network.

In step 608, the predictive accuracy is tested on the validation set. Based on the outcome, hyper-parameter tuning may be performed (e.g. to modify features of the model such as the number of hidden layers/hidden neurons etc.) in step 610. The best model may be selected e.g. after a fixed number of iterations or the process may be continued until the accuracy determined in step 608 is sufficient to a predetermined threshold.

Once a satisfactory model has been trained, the classification model is stored/output (step 612) for use in predicting attribute values for missing attributes. At this stage, the model can be deployed for use in the data import and processing pipeline (202-206, FIG. 2), where it is used to estimate any missing or corrupted attributes.

Dependent on the use cases, multiple models can be trained corresponding to the target attributes that need to be imputed. Typically, the input features for each model are selected based on expert knowledge. Alternatively, automatic feature selection techniques may be used or the models may be trained on all available features.

The model may also output a confidence level for an imputed attribute value that can be displayed to a user with the asset information, to allow the user to assess the reliability of the imputed data. A confidence level for the predicted output is determined by use of a Softmax function to produce a probability.

Once a model has been built, it is used by the consolidation and data preparation pipeline during processing of new data to complete missing attribute values. For example, if a "location" attribute is missing for an asset imported from a given source inventory, then the location attribute value can be predicted using a suitably trained prediction model.

Figure 7:
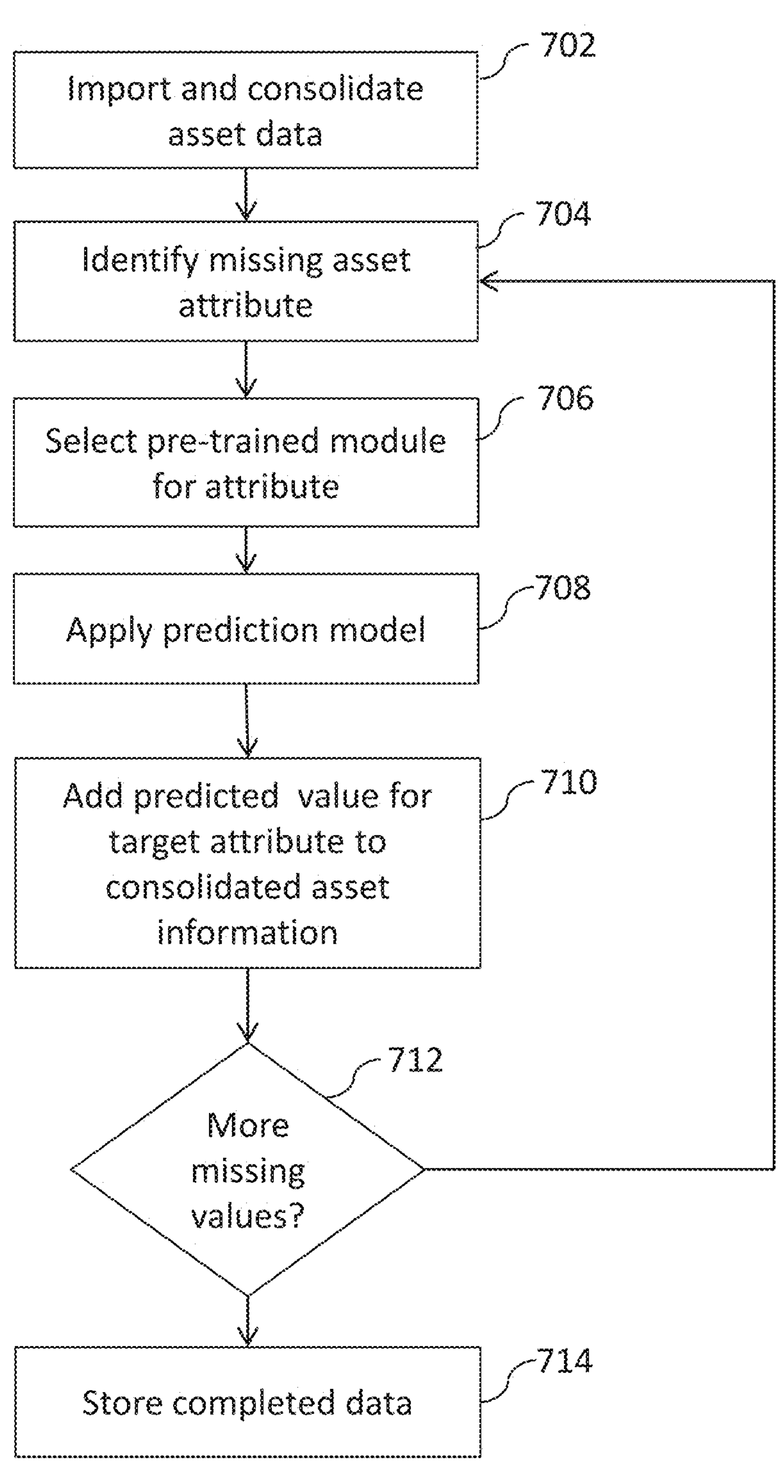
FIG. 7 illustrates a process for imputing a missing attribute value using a trained prediction model.

The data completion process is shown in FIG. 7.

In step 702, data is imported, consolidated and processed as previously described.

In step 704, the process identifies a missing attribute value for an asset in the consolidated data. In step 706, the process selects a pre-trained prediction model for the missing attribute. If no such model is available for the attribute in question, no value is imputed for that attribute and the process continues to step 712.

Assuming a model is available, the process generates a feature matrix for the input features to the model based on the other attributes of the asset, using the same data preparation/conversion steps used during model training. The prediction model is then applied to the input features in step 708 to generate a predicted value for the missing attribute. The predicted value is added to the asset object (step 710).

In step 712 the process determines whether there are further attributes for the asset that have missing values. If so, the process returns to step 704, with the above process being repeated.

Once no more missing attribute values are found, the updated asset object with the imputed values is stored in the database in step 714.

The above process may be repeated for any number of assets in the database. The process may be applied automatically, e.g. during the import, consolidation and preparation pipeline, or later, e.g. on user request.

While descried principally in relation to missing values, the process may also be applied to replace invalid or corrupted values of an attribute with a new value. For example, if a value for a categorical attribute does not match an allowed set of category labels, or a numerical value is outside an allowed range, or a value does not match an expected data type or format, then that value may be treated as if it were a missing value, and the described imputation process applied to generate a replacement value for the attribute.

Similarly, this approach can be used to resolve conflicting values. Where different data sources provide different values for a given attribute, the prediction method could be used to generate a predicted value which could then be used directly as a replacement value, or alternatively the value from a particular source that matches, or is closest to, the predicted value, can be used.

Instead of a neural network model, other types of machine learning models, for example decision trees, could be used for attribute prediction.

While the above examples consider categorical target attributes the process can be used with other attribute types. For numerical attribute values, neural network models could similarly be used, or other regression models could be used such as linear/logistic regression models or regression trees.

Analytics Layer

As shown in FIG. 2, the analytics layer 210 includes analytics engine 212 for analysing data in the asset DB 104/graph DB 106 to obtain information relating to the assets. For example, the analytics engine identifies relationships between assets and builds a relational model around the assets to support search for and querying context among assets, such as associated IP addresses/MAC addresses of devices. The analytics engine also evaluates known inventory information against live network data to identify unknown assets and interactions.

Figure 8:
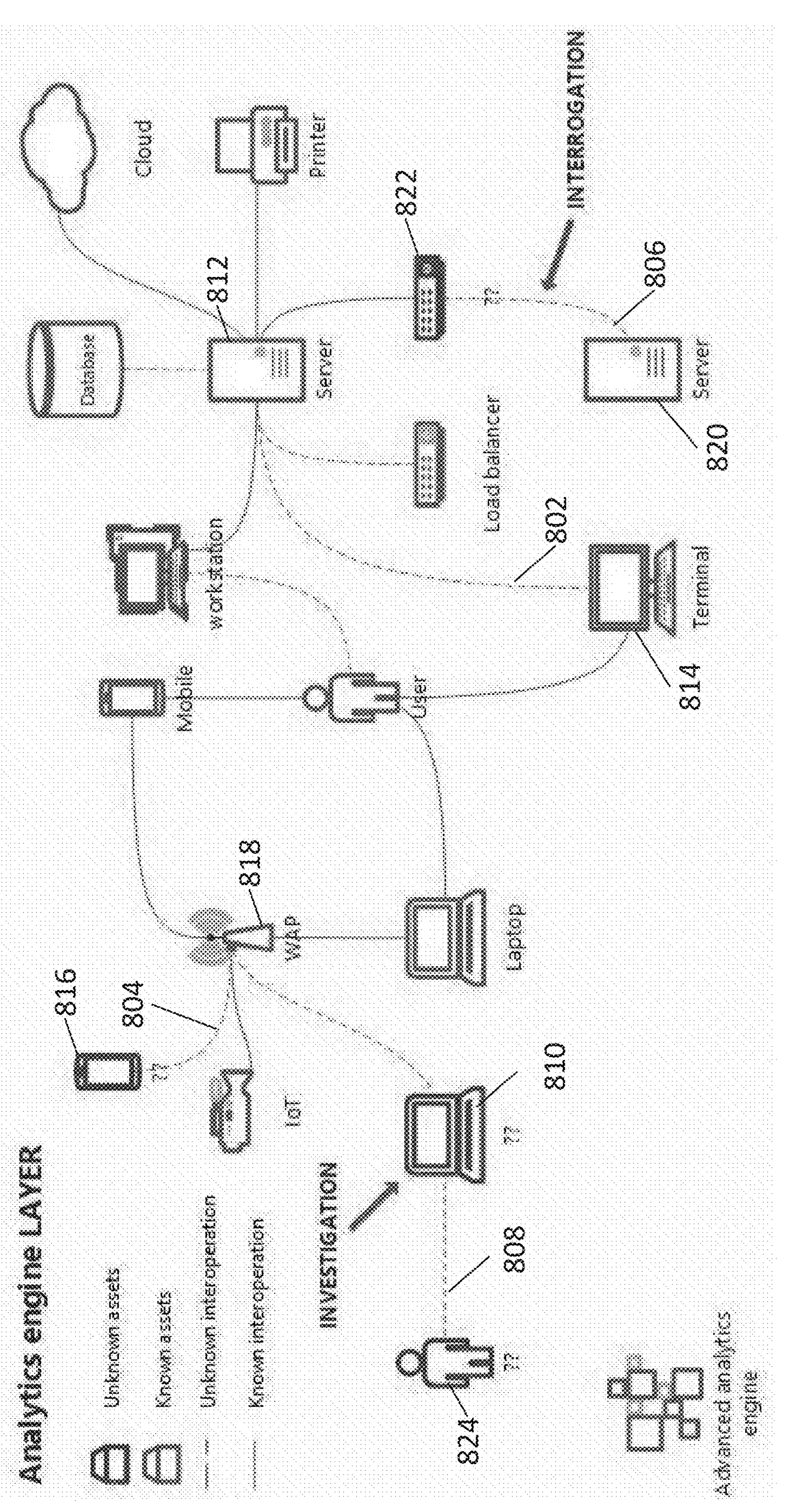
FIG. 8 illustrates use of a connection graph to detect unknown assets and asset interactions.

An example is depicted in FIG. 8, showing a graph model of an IT network infrastructure of various assets and instances of interaction between those assets, as generated e.g. in step 524 of FIG. 5. Note that graph generation may be implemented as part of the analytics engine or as a separate step, with the analytics engine further processing the initial graph representation to derive additional information (which can then be used to further augment the model).

The term "interaction" here may include both network-based interaction and other activity associating two assets or entities in the infrastructure. For example, interaction may include:

- Network traffic (802) between devices or entities, e.g. between a server 812 and terminal 814
- A mobile/wireless device (816) connecting (804) to a wireless access point (818)
- Network traffic to or from a particular device 820 being routed (806) via a particular switch, router, firewall, load balancer or other networking device 822
- A user 824 locally logging into or using (808) a workstation 810 or remotely connecting to a server
- A network protocol exchange, such as a DHCP/DNS request or response, between assets Some assets and interactions are typically known from various existing inventory sources 130, whilst others may be detected from live network monitoring data obtained from the network monitoring system 132.

For example, the analytics engine may detect a new computer device 810 on the network from traffic data by determining that a MAC address used as source/destination in the traffic does not match any known asset. The analytics engine may also detect previously unknown interactions between assets/entities, for example between

- Two known assets, e.g. communication 802 between a known server 812 and known terminal 814 that were not previously known to communicate with each other
- A known asset and an unknown asset, e.g. traffic 806 from a known server 820 being routed through an unknown switch or router 822
- Two unknown assets, e.g. interaction 808 in which a previously unknown user 824 connects via an unknown client device 810

Additionally, the analytics engine may detect and flag interactions between types of assets that would not normally interact (e.g. a vending machine communicating with a server in a SWIFT network). Such suspicious interactions may be detected via fixed rules (e.g. specifying device types expected to interact or not to interact) and/or via dynamic learning processes. For example, a network graph based anomaly detection process can be used, as described in more detail later.

The system can support further investigation of unknown (or suspicious) assets and interactions, for example by viewing the acquired asset information and relationships with other assets, and/or by active interrogation of the unknown assets and interactions. In one example, the user could choose to further investigate previously unknown interaction 806 between a server and network switch. The system then configures the network monitoring system to acquire additional monitoring information relating to the interaction, for example by using a monitoring agent or packet sniffer to obtain traffic records relating to the interaction.

For unknown assets that are unknown to the existing inventory sources, these are typically discovered by the network monitoring/discovery subsystem. Asset data for a newly discovered asset may be obtained e.g. by direct interrogation of the asset or an associated network management entity.

In preferred embodiments, the attribute prediction functionality can be extended by using contextual information relating to assets. In one approach, the analytics engine inspects the graph model of an unknown asset to identify proximity (e.g. as network distance) to other assets that connect with the unknown asset. Attribute prediction can then be applied based on connected assets (optionally limiting to proximal connected assets) and/or based on asset similarity (e.g. with respect to type and/or other attributes) to output a set of desired asset properties with a certain confidence level (or probability). By using only assets that are similar and/or connected/proximal to the asset, prediction accuracy may be improved. The analytics engine can use this approach to produce classifications and associated probabilities for a set of desired characteristics, such as device type, OS family, or location.

Application Layer

The application layer 220 implements various application functions that utilise the information in the asset/graph databases and any additional information generated by the analytics layer.

This includes an inventory application 222 which allows the system to be used as a general inventory system allowing visualisation and exploration of the managed infrastructure and its assets, allowing the user to identify and investigate both known and unknown assets and provide rich actionable contextual information from network/relational analysis, which will further enable downstream applications.

In particular, the inventory application provides an asset enumeration function which provides a comprehensive list of assets, allowing the user to identify a device uniquely and query where and when the device connects to the network. In the security context this can provide a clear picture of the "attack surface", i.e. scope of vulnerability, of the managed infrastructure.

Figure 9:
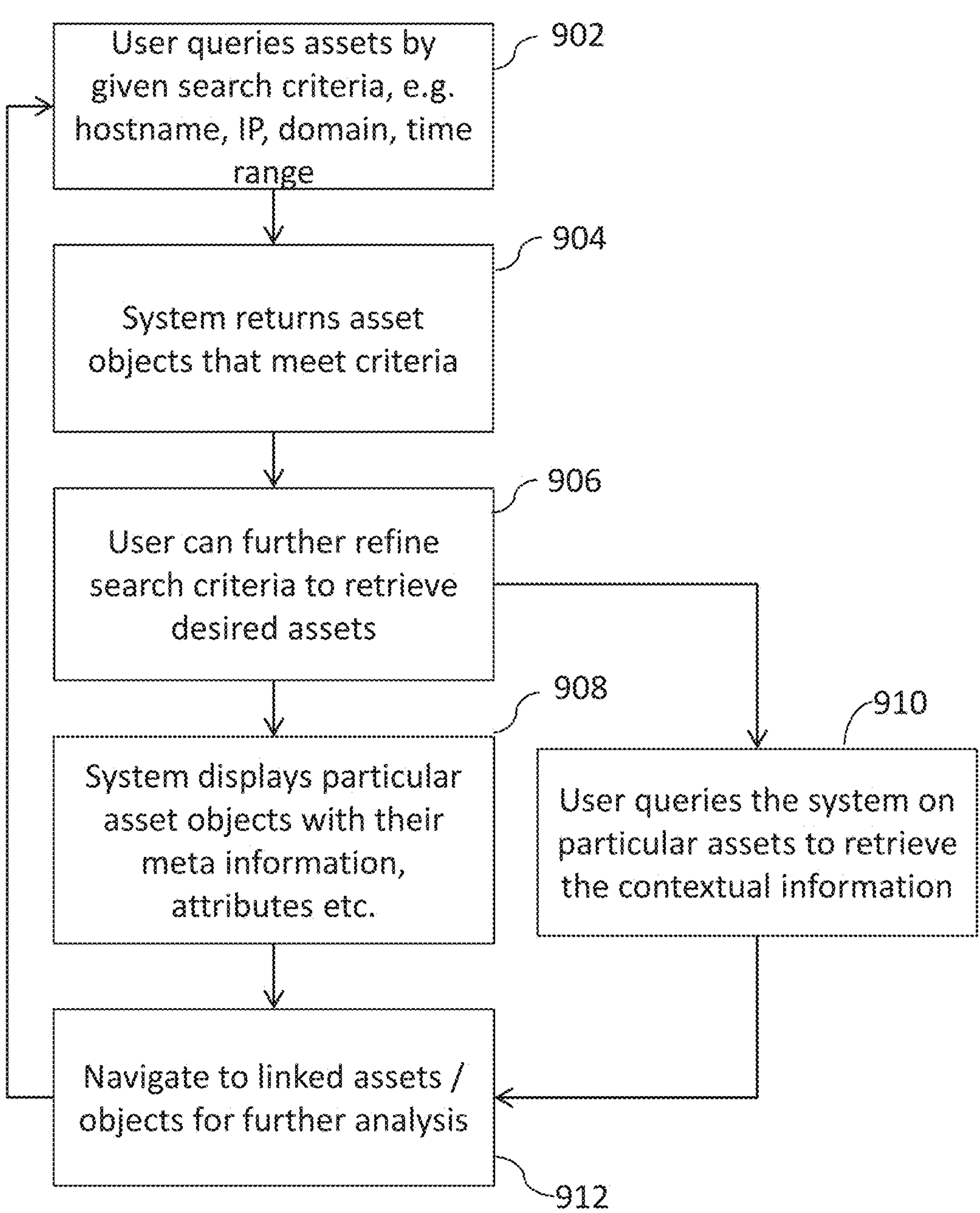
FIG. 9 illustrates a process for interacting with the asset inventory.

Typical usage of the inventory application to query asset information is illustrated in FIG. 9.

In step 902, the user specifies search criteria for a query, for example, hostname, IP address, network domain and/or a time range. The system searches the asset database and returns a list of asset objects that meet the search criteria in step 904. If necessary, the user can refine the query criteria in step 906 (possibly repeatedly) to narrow the search results down to objects of interest. The user can then further interact with the search results in various ways, for example to display meta information and asset attributes (step 908) and/or to retrieve contextual information (step 910) relating to connected assets and interactions with other assets, for example:

- Connectivity—the networking environment associated with the assets and how an asset is connected to other objects;
- network activities that have been discovered from network traffic, event logs, etc., for example DNS requests, DHCP leases and so on;

The user can also navigate to a specific asset in the search results or to linked assets in the context results (step 912) to display detailed asset information and/or perform further analysis functions.

As mentioned, the data collection/consolidation and analytics performed by the system allows identification of both known and unknown assets. Since the system consolidates various sources, it builds a superset of everything that exists in inventories, as well as those assets discovered by network monitoring and discovery tools. The inventory application can highlight "unknown" assets, i.e. those identified through network discovery rather than from existing inventories, in the asset inventory, connection graph and in search results (e.g. by using a particular label or display colour) to allow the user to quickly identify and investigate these unknown assets.

Examples of other application functions 224 provided in the application layer could include:

- Security control coverage: Determining how well the infrastructure is covered by security controls (e.g. firewalls, antivirus systems etc.), for example by calculating how many assets are covered by security controls against the total number of assets that should be covered.
- Cyber risk quantification: Quantifying cyber risk as a risk score for assets by estimating the security controls imposed on the assets
- Metrics dashboard: A dashboard for displaying high-level meta information about how accurate the inventory and asset information are and giving an overview of the managed infrastructure.
- Cost estimation: A tool for estimating the cost of certain services and applications by taking the associated assets and data exchanged into account.

Graph Anomaly Detection for Network Segmentation

Preferred embodiments provide a graph-based anomaly detection function (e.g. implemented in the analytics layer, application layer, or a combination). The anomaly detection function can be used to detect anomalies indicating possible security risks, as well as for network segmentation.

For organisations that have thousands of servers and services, it is often a challenge to segment both the internal and external network environment to enforce corporate security policies. As described above, the present system can be used to create a rich inventory of the network environment by consolidating asset information for known and unknown assets and can also provide a real-time relational model identifying the communication between devices and services. In preferred embodiments, this capability is leveraged to implement a graph-based anomaly detection system by evaluating an asset's connectivity (e.g. in terms of in-/outbound connection degrees and data flows) using graph neural networks. Anomalous assets flagged as having unusual connectivity can then be investigated and can be used to aid automatic network segmentation decisions.

Network segmentation involves defining logical groupings of networked assets (e.g. through a set of segmentation rules). The segmentation is defined such that, during normal operation, connectivity should not be seen across segments unless explicitly defined in a security policy. Otherwise, such connections are detected as anomalies. Thus, anomaly detection on connection patterns can be a useful approach for network segmentation.

Network segmentation is a graph problem that relies on understanding how assets communicate in a network. Normally, a network will have rules defined to regulate how assets should connect to each other, and this should be reflected in the graph model derived by the inventory system. To detect anomalies, the anomaly detection module learns what a typical structure will look like for each node, to allow detection of an anomaly when the structure deviates from its normal pattern. Anomalous traffic can then be investigated and blocked if needed.

The anomaly detection algorithm uses an embedding process based on struc2vec to produce node embeddings. A description of struc2vec is available in L. Ribeiro et al. "struc2vec: Learning Node Representations from Structural Identity", 23rd ACM SIGKDD International Conference on Knowledge Discovery and Data Mining (2017), available at: https://arxiv.org/pdf/1704.03165.pdf.

In this approach, each asset is represented as a node embedding which encodes the characteristics of both the node and its connectivity pattern (representing connectivity to other nodes). Deviations from this representation can then be seen as anomalies.

Figure 10:
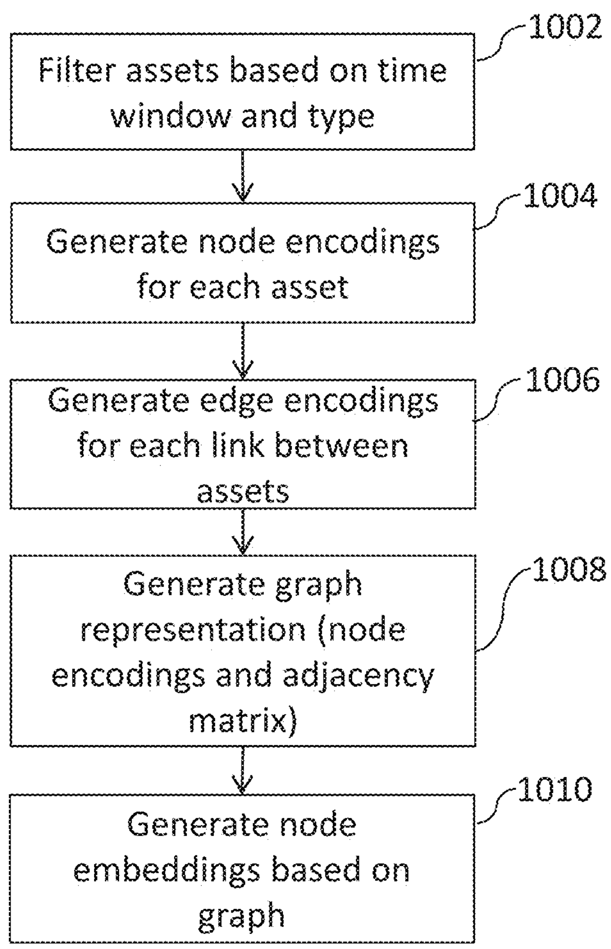
FIG. 10 illustrates a process for deriving node embeddings from an asset connection graph.

FIG. 10 illustrates a process for generating a graph representation and deriving node embeddings for asset nodes of the graph.

In step 1002, the assets and associated connectivity data from the asset database are filtered for a given time window such as 1 hour (based on asset activity from live network data, as described above) and based on type to select only relevant asset types. In an example, the system may select only assets objects corresponding to assets with "server"

type. However, other criteria could also be used to select relevant assets for the subsequent analysis.

To construct the graph, in step 1004, the assets are represented as nodes, with each node being encoded as a numeric vector characterizing the asset attributes. For servers, the system can select suitable attributes such as server type, criticality, network zone, OS, associated applications, hosting country, ownership and the like. The specific attributes used may be user-selectable. Conversion of non-numeric data to numeric features may be performed as previously described.

For each node, edge vectors are defined with respect to each link with another node (e.g. representing network interactions, connections and/or other relationships detected from live network data as previously discussed). The edge vectors encode attributes of the links, resulting in edge encodings for each link between assets (step 1006). Link/edge attributes may include features such as number of connections, in-/outbound data volumes (e.g. number of bytes or packets in/out), connection duration and other traffic information over the defined time window. As for the node representations, link attributes are converted to numerical formats to generate the edge representations.

In step 1008, the process generates a graph representation of G=<V, E>, where V is the vector of all nodes encoded with their features, and E is an adjacency matrix, where each entry is an edge vector encoded by the link features.

In step 1010, node embeddings are generated for each node based on node connectivity. Preferred embodiments use the struc2vec algorithm to train on all nodes and generate a node embedding for each node. The node embedding is a vectorized representation of the local neighbourhood of a node with k hops. The higher k is, the wider the neighbourhood will be. The node embedding considers the connection degree of each node (the number of other nodes to which a node is directly connected in the graph) in the k-hop neighbourhood. This step results in a representation (the node embedding) for each node that is representative of the connectivity structure between the node and other nodes within the k-hop neighbourhood.

Additional features such as server type or OS and edge attributes such as data rates can be supplied as additional dimensions of the node embeddings. In an embodiment, attributes of neighbour nodes can be aggregated to the node itself to form additional dimensions for that node. However, in other embodiments, node embedding may be purely connectivity based, e.g. as in the basic struc2vec algorithm.

The resulting node embeddings are used as the basis for anomaly detection.

Figure 11:
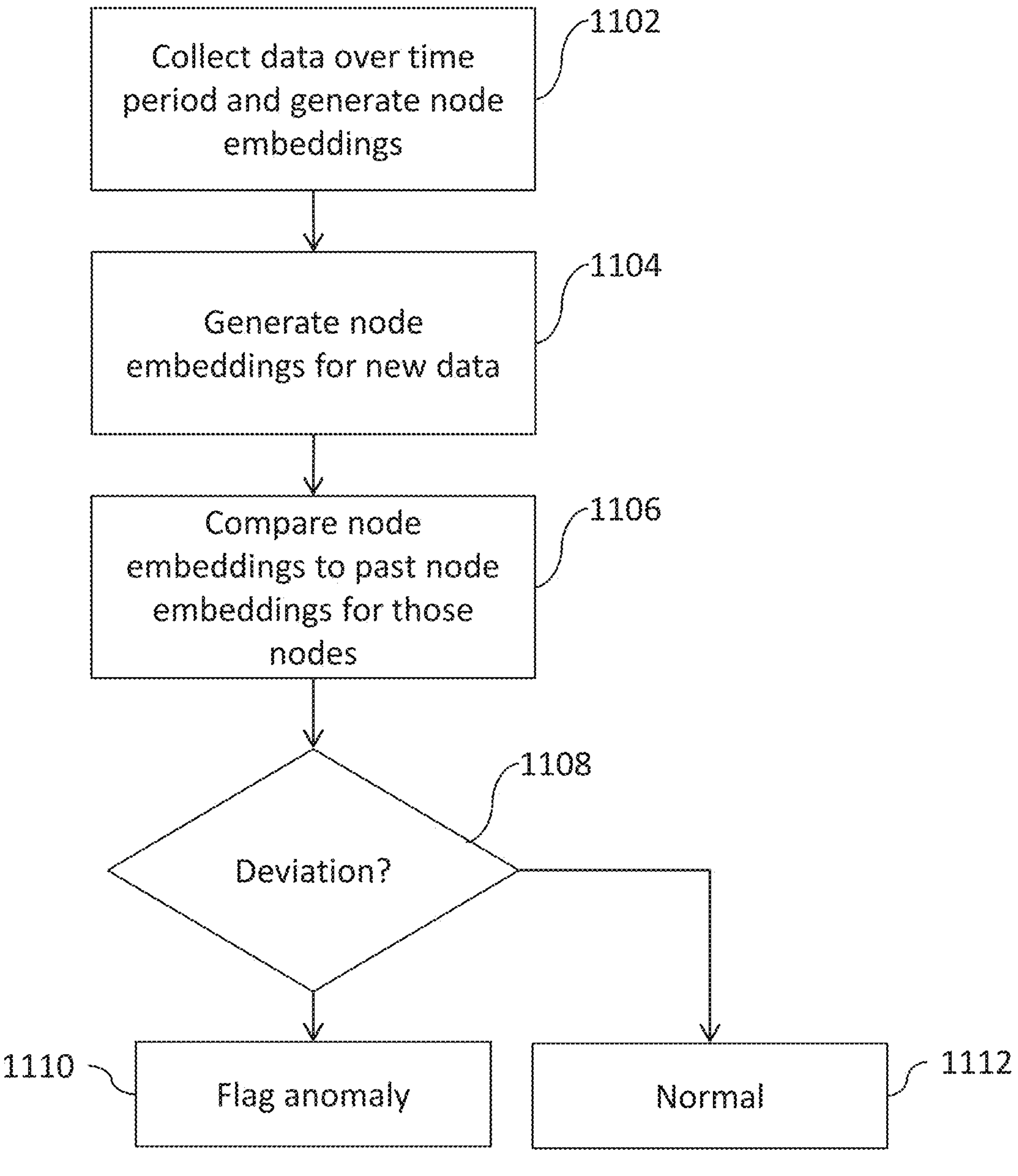
FIG. 11 illustrates a process for using the node embeddings to detect anomalies.

FIG. 11 illustrates a machine learning process which uses the FIG. 10 process to generate node embeddings.

In step 1102, training data is collected for some period, e.g., 30 days, to form a training set of training samples <V, E, t> where t represents a defined time window (e.g. 1 hour), from which node embeddings are generated using the FIG. 10 process.

In step 1104, new data is processed and evaluated against the training data—for example asset data from the database for a current/most recent time window, or some other selected time window, may be selected. Asset data (including connectivity data) from the asset database relating to that time window (and matching the selected asset type, e.g. server, and/or other filter criteria) is processed using the FIG. 10 process to generate a graph representation and the associated node embeddings for the assets.

To test for anomalies on a given node, the new node embedding for the node is compared in step 1106 with one or more previous node embedding(s) for that node from the training set (corresponding to the node and its connectivity at earlier times) to test how the node deviates from its historical representations. If the node embedding deviates from the past embeddings sufficiently (test 1108), the node is flagged as anomalous in step 1110. Otherwise, the node is flagged as normal in step 1112. This test may be repeated for each node in the network graph being evaluated.

Deviation is determined based on a node similarity or distance measure. In an embodiment, a Euclidean distance or cosine similarity measure between node embeddings is used. If the distance measure exceeds some threshold (or the similarity measure falls below some threshold) then the system identifies a deviation of sufficient magnitude to flag as anomalous.

Steps 1104-1112 may be repeated as needed. For example, the process could be repeated hourly on current asset data to identify anomalies as they arise, or in a batch analysis on a daily or weekly basis. Alternatively, the process could be run on demand, e.g. to investigate the node graph for a particular time window.

Furthermore, the training stage (1102) could be repeated periodically to ensure the model of node embeddings evolves with the underlying network and asset inventory.

Various automatic actions may be implemented when an anomaly is detected. For example, when a particular node is flagged as anomalous, a notification to an operator or user may be generated. The notification can be displayed within the inventory application and/or sent as an electronic message (e.g. instant message, SMS, email etc.) to a user device of an operator.

The system may also perform control actions in the network, for example:

- Initiating collection of additional network data, such as traffic statistics relating to the node and/or other operational characteristics of the node such as performance statistics (e.g. CPU/memory load) to allow more detailed analysis of behaviour of the asset.
- Reconfiguring or shutting down the asset—e.g. modifying access control lists or other security configurations to exclude unwanted traffic
- Sending a notification to other network security components such as an intrusion detection system to trigger follow-up investigations.

The above process involves generating a graph representation of assets, from which the node embeddings used by the anomaly detection are derived. These may be generated directly from the asset data in the asset database 104. However, in some embodiments, the necessary graph representation may be derived from the asset graphs in the graph database 106, created as described previously. In that case, a specific asset graph may be selected (or generated on-demand if not already available in the graph database as described above), corresponding to a particular time window of interest, e.g. a 1 hour time window, and then used as the basis for generating the node embeddings.

Example Computer System

Figure 12:
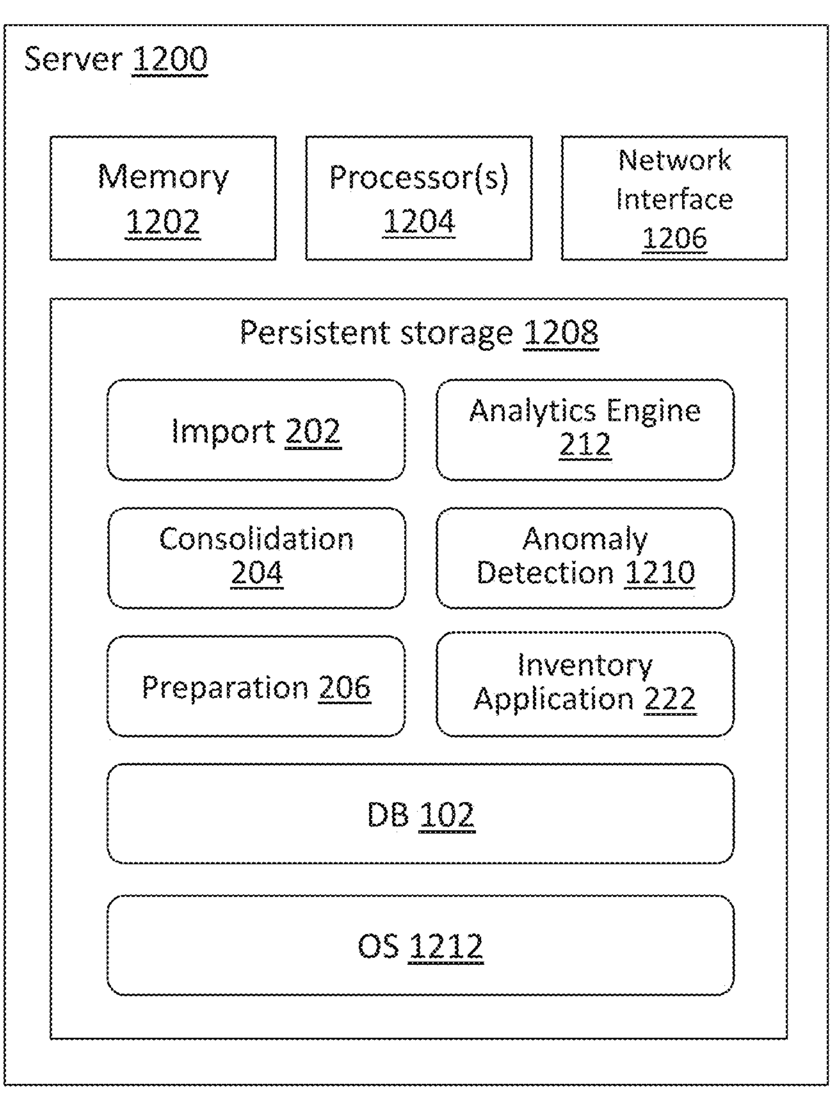
FIG. 12 illustrates a server for use in implementing described functionality.

FIG. 12 illustrates an example of a server 1200 that may be used to implement inventory system 100 of FIG. 1.

The server 1200 includes one or more processors 1204 together with volatile/random access memory 1202 for storing temporary data and software code being executed.

A network interface 1206 is provided for communication with other system components, such as the inventory data sources 130, network monitoring/discovery system 132 and client devices 128, over one or more networks (e.g. Local and/or Wide Area Networks, including the Internet).

Persistent storage 1208 (e.g. in the form of hard disk storage, optical storage and the like) persistently stores software and data for performing the described functions of the inventory system. For example, this may include data import, consolidation and preparation modules 202, 204, 206 and the database 102 for storing the asset and graph databases, with modules 202-206 implementing the data ingestion pipeline and storing the resulting consolidated asset information in the database. Persistent storage 1208 further includes the analytics engine 212, an anomaly detection module 1210 and the inventory application 222 for performing the analytics, anomaly detection, and inventory/asset enumeration functions described previously.

The stored software further includes a server operating system 1212 and any other software and data needed for operating the server. The server will include other conventional hardware components as known to those skilled in the art, and the components are interconnected by one or more data buses (e.g. a memory bus and I/O bus).

While a specific architecture is shown and described by way of example, any appropriate hardware/software architecture may be employed to implement the inventory system.

Furthermore, functional components indicated as separate may be combined and vice versa. For example, the functions of inventory system 100 may be performed by a single server 1200 or may be distributed across multiple servers. As a concrete example, the database 102 could be stored at a separate database server, possibly along with one or more of the modules 202-206 for data ingestion.

The inventory application 222 may be a web application and thus may be implemented server-side by a web server providing back-end components for the application, with front-end components served for execution by client device 128 (FIG. 1). The client device may be a standard user device such as personal desktop or laptop computer, tablet computer, smartphone or other mobile device, running a web browser for accessing the web application (or alternatively running a bespoke local application).

It will be understood that the present invention has been described above purely by way of example, and modification of detail can be made within the scope of the invention.

The invention claimed is:

1. A method for detecting network anomalies, comprising:

receiving asset data defining a plurality of network assets of a computer network infrastructure from a plurality of network information sources;

creating a consolidated asset inventory database using an analytics engine based on the asset information, comprising a plurality of asset data objects representing assets, each data object associated with a plurality of asset attributes;

wherein the consolidating comprises, for a given network infrastructure asset:

identifying asset data from two or more of the sources relating to the same given network infrastructure asset based on one or more common identifier values;

identifying relationships detecting previously unknown interactions between the asset data and to create a relational model;

combining the identified asset data and the relational model into a consolidated data representation of the asset in the consolidated inventory database associated with the one or more common identifier values and including attributes from the multiple sources;

creating at least one prediction model comprising a neural network by converting non-numeric asset attribute values into a numerical representation as input to the neural network, producing classifications and probabilities for a respective target attribute;

training the at least one prediction model, based on asset information, to predict the respective target attribute for each of the plurality of network assets based on at least one other asset attribute, applying the at least one prediction model to one or more other attributes of the given asset to generate a predicted value for the identified attribute; and storing the predicted value for the attribute in the consolidated asset data representation for the given asset in the database;

accessing interaction data relating to an interaction between network assets of the plurality of network assets, the interaction data providing information on interactions occurring between the network assets;

receiving a time parameter pertaining to time of the interaction;

creating a connectivity graph indicating connections between a set of network assets in the database, the connectivity graph comprising nodes that are encodings of the set of network assets and edges that are encodings of connections between network assets in the network determined based on interaction data relating to a given time period defined the time parameter;

generating a node embedding for a node of the graph, wherein the node embedding comprises a vector representation of the nodes and the within the graph; and comparing the node embedding to one or more further node embeddings to detect an anomaly.

2. A method according to claim 1, wherein the one or more further node embeddings comprise node embeddings corresponding to the same node at one or more other times.

3. A method according to claim 1, comprising performing one or more of:

detecting an anomaly if the node embedding deviates from the one or more further node embeddings;

in response to detecting an anomaly, transmitting a notification of the anomaly to a user device;

in response to detecting an anomaly, performing a control action in the network and/or at the asset associated with the node identified as anomalous.

4. A method according to claim 1, wherein creating a connectivity graph comprises creating a node for each of a plurality of assets and associating with each node an asset vector, comprising a set of attribute values associated with the asset, the method optionally comprising repeating the generating and comparing steps for a plurality of nodes of the graph.

5. A method according to any of claim 1, comprising creating an adjacency matrix defining graph connectivity, the adjacency matrix defining edges between nodes corresponding to links between assets in the network, and associating with each edge one or more attributes specifying link attributes of the corresponding network link.

6. A method according to claim 1, comprising:

collecting asset data relating to assets and asset connectivity for a training period;

generating training samples based on the collected asset data, each training sample specifying a connectivity graph;

for each training sample, generating node embeddings for nodes of the connectivity graph for the training sample; and wherein the comparing step compares the node embedding to one or more of the generated node embeddings.

* * * * *